(12) United States Patent
Ikeda

(10) Patent No.: US 9,113,059 B2
(45) Date of Patent: Aug. 18, 2015

(54) IMAGE PICKUP APPARATUS AND IMAGE REGION DISCRIMINATION METHOD

(71) Applicant: CANON KABUSHIKI KAISHA, Tokyo (JP)

(72) Inventor: Koichiro Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 13/688,092

(22) Filed: Nov. 28, 2012

(65) Prior Publication Data

US 2013/0135492 A1    May 30, 2013

(30) Foreign Application Priority Data

Nov. 30, 2011 (JP) ................... 2011-262684
Nov. 30, 2011 (JP) ................... 2011-262703

(51) Int. Cl.
  *H04N 5/225* (2006.01)
  *H04N 5/232* (2006.01)
  *G02B 7/36* (2006.01)

(52) U.S. Cl.
  CPC ............ *H04N 5/225* (2013.01); *G02B 7/36* (2013.01); *H04N 5/23212* (2013.01); *H04N 5/23293* (2013.01); *H04N 5/23296* (2013.01)

(58) Field of Classification Search
  CPC ... H04N 5/225; H04N 5/23296; H04N 5/232; H04N 5/23212; H04N 5/23293
  USPC ................................................ 348/222.1
  See application file for complete search history.

(56) References Cited

U.S. PATENT DOCUMENTS

| | | | |
|---|---|---|---|
| 2004/0160519 A1* | 8/2004 | Horita | 348/234 |
| 2008/0002961 A1 | 1/2008 | Sundstrom | |
| 2008/0189036 A1* | 8/2008 | Elgersma | 701/211 |
| 2009/0074393 A1 | 3/2009 | Park | |
| 2009/0160963 A1 | 6/2009 | Kim | |
| 2009/0167928 A1* | 7/2009 | Asukabe et al. | 348/345 |
| 2009/0195666 A1* | 8/2009 | Chen et al. | 348/218.1 |
| 2009/0284610 A1* | 11/2009 | Fukumoto et al. | 348/208.99 |
| 2010/0080482 A1 | 4/2010 | Wong | |
| 2010/0165152 A1* | 7/2010 | Lim | 348/240.99 |
| 2011/0080494 A1* | 4/2011 | Mori et al. | 348/222.1 |

(Continued)

FOREIGN PATENT DOCUMENTS

CN    1652010 A    8/2005
CN    101548232 A   9/2009

(Continued)

*Primary Examiner* — Nicholas Giles
*Assistant Examiner* — Abdelaaziz Tissire
(74) *Attorney, Agent, or Firm* — Canon U.S.A., Inc., IP Division

(57) ABSTRACT

There is provided an image pickup apparatus that, even if image data has insufficient depth difference between an object and a background, accurately discriminates a region including an object and a region including a background. The image pickup apparatus includes a generation unit configured to generate image data, and a discrimination unit configured, based on first image data generated by the generation unit, when an in-focus position is at a first focal position at which an object is in-focus state or a second focal position on a short distance side of the first focal position, and second image data generated by the generation unit, when an in-focus position is at a third focal position on a far distance side of a focal position at which a background is in-focus state, to discriminate a first region including the object and a second region including the background.

14 Claims, 11 Drawing Sheets

(56) References Cited

U.S. PATENT DOCUMENTS

2011/0150349 A1 6/2011 Kojima
2011/0273531 A1 11/2011 Ito

FOREIGN PATENT DOCUMENTS

| | | |
|---|---|---|
| EP | 1349371 A2 | 10/2003 |
| EP | 2171685 A1 | 4/2010 |
| JP | 2004-246644 A | 9/2004 |
| JP | 2007-124398 A | 5/2007 |
| JP | 2007-300221 A | 11/2007 |
| JP | 2008-245054 A | 10/2008 |
| JP | 2009-177782 A | 8/2009 |
| RU | 2389050 C1 | 5/2010 |
| WO | 2009/017138 A1 | 2/2009 |

* cited by examiner

BLUR AND BLEED

IMAGE PICKUP APPARATUS AND IMAGE REGION DISCRIMINATION METHOD

BACKGROUND OF THE INVENTION

1. Field of the Invention

The present invention relates to an image pickup apparatus, a control method for the image pickup apparatus, and a storage unit. More particularly, the present invention relates to an image pickup apparatus such as an electronic still camera or a video camera, and a control method for the image pickup apparatus, and a storage medium that stores a program for controlling the image pickup apparatus.

2. Description of the Related Art

In recent years, many image pickup apparatuses such as digital cameras or digital video cameras are provided with functions for performing image processing on a region other than an object of interest. For example, as one of the functions, there is a function for giving a pseudo blurring effect to a background region of picked-up image data, for example.

Generally, if an image pickup apparatus has a large image sensor like a single-lens reflex camera, the depth of field becomes shallow by opening an aperture to make the focal distance longer, and it becomes relatively easy to pick up the image data that has a blurred background other than the object that is in focus as described above.

On the other hand, in an image pickup apparatus having a small image sensor such as a compact digital camera, even if the above-described method is employed, the depth of field tends to become deeper, and as a result, it is difficult to pick up the image data with a blurred background.

In view of this fact, it is known that even the image pickup apparatus having a small image sensor such as a compact digital camera can acquire image data with a blurred background, by discriminating an object region from a background region of the picked-up image data, and performing the filtering processing on the background region.

Japanese Patent Application Laid-Open No. 2007-124398 discusses a technique for acquiring a spatial frequency component from the picked-up image data, in order to discriminate an object region and a background region. That is, in the technique discussed in Japanese Patent Application Laid-Open No. 2007-124398, a blur amount on the background side of the picked-up image data is increased by adjusting the position of a focus lens so that the object is positioned at rear end of the depth of field. Then, a spatial frequency component amount for each of a plurality of segmented blocks is calculated, and a block of which value is equal to or greater than a threshold value is discriminated as the object region.

However, in the technique discussed in Japanese Patent Application Laid-Open No. 2007-124398, there is a problem that sufficient accuracy cannot be obtained if a blur amount on the background region side is small, since discrimination between the regions is performed from the space frequency component amount of one frame of the image data. In particular, in the image pickup apparatus having a small image sensor like the compact digital camera which is in widespread use in recent years, there is a tendency that sufficient blur amount is not obtained even when the above-described processing is performed. As a result, it is difficult to perform discrimination between the regions from the space frequency component amount of one frame of the image data.

SUMMARY OF THE INVENTION

The present invention is directed to an image pickup apparatus, a control method for the image pickup apparatus, and a storage unit capable of, even if image data has an insufficient depth difference between an object and a background, accurately discriminating a region containing the object from a region containing the background.

According to an aspect of the present invention, an image pickup apparatus includes a generation unit configured to generate first image data, when an in-focus position is a first focal position at which an object is in focus state or a second focal position on a near distance side of the first focal position, and second image data generated by the generation unit, when an in-focus position is a third focal position on a far distance side of a focal position at which a background is in focus state, and a discrimination unit configured, based on the first and second image data generated by the generation unit, to discriminate between a first region including the object, and a second region including the background.

According to another aspect of the present invention, a control method of an image pickup apparatus includes discriminating, based on first image data obtained at an in-focus position which is a first focal position at which an object is in focus state or a second focal position on a near distance side of the first focal position, and second image data obtained at an in-focus position which is a third focal position on a long distance side of a focal position at which a background is brought into focus, a first region containing the object and a second region containing the background.

According to yet another aspect of the present invention, a storage medium storing a program for controlling an image pickup apparatus, wherein the program executes a process via a computer includes discriminating, based on first image data obtained at an in-focus position which is a first focal position at which an object is brought into focus or a second focal position on a near distance side of the first focal position, and second image data obtained at an in-focus position which is a third focal position on a far distance side of a focal position at which a background is brought into focus, a first region including the object and a second region including the background.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
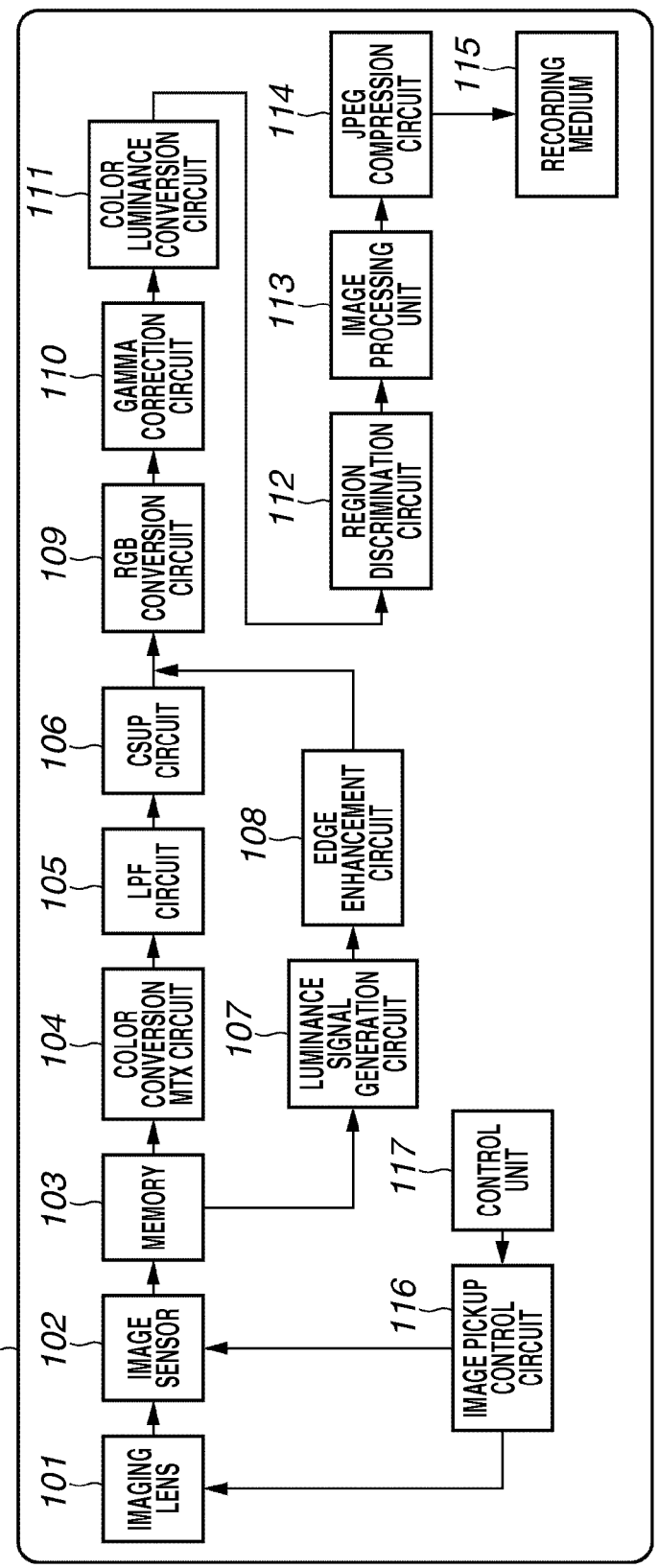
FIG. 1 is a block diagram illustrating a configuration of an image pickup apparatus 100 according to an exemplary embodiment of the present invention.

First, an overall configuration of an image pickup apparatus according to an exemplary embodiment of the present invention will be described with reference to FIG. 1. FIG. 1 is a block diagram illustrating a configuration of the image pickup apparatus 100 according to an exemplary embodiment of the present invention.

The image pickup apparatus 100 includes a control unit 117 that performs control of the entire image pickup apparatus 100. The control unit 117 is constituted by a central processing unit (CPU) or a micro-processing unit (MPU), and controls an operation of each circuit described below. The control unit 117 controls driving for adjusting a diaphragm (not illustrated). An image pickup control circuit 116 controls a diaphragm driving mechanism (not illustrated) for changing an aperture diameter of the diaphragm, according to a signal from the control unit 117.

Further, the control unit 117 controls driving for adjusting a focus lens (not illustrated) within an imaging lens 101. The image pickup control circuit 116 controls a lens driving mechanism (not illustrated) that performs focusing by driving the focus lens in an optical axis direction, according to a signal from the control unit 117. The lens driving mechanism includes a stepping motor or a direct current (DC) motor as a driving source. As lenses within the imaging lens 101, a variable power lens and a stationary lens in addition to the focus lens are provided, and a lens unit is configured including these lenses.

An image sensor 102 is constituted by a charge-coupled device (CCD) sensor or a complementary metal-oxide-semiconductor (CMOS) sensor or other sensors, and its surface is covered with RGB color filters like, for example, Bayer array, which enable color image pick up. An object image incident via the imaging lens 101 including the focus lens is formed on the image sensor 102. The image sensor 102 photoelectrically converts the object image to generate image data. Then, the generated image data is stored in a memory 103.

The control unit 117 calculates a shutter speed and an aperture value which allow the entire image data to have a proper exposure, and calculates a driving amount of the imaging lens 101 to focus on the object. Then, the exposure value (shutter speed, and aperture value) calculated by the control unit 117 and information indicating the driving amount of the imaging lens 101 are output to the image pickup control circuit 116. Exposure control and focus adjustment are performed based on the respective values.

A color conversion matrix circuit 104 applies a color gain to the picked-up image data to be reproduced in an optimal color, and converts them into color difference signals R-Y and B-Y. A low pass filter (LPF) circuit 105 is used to limit bands of color difference signals R-Y and B-Y. A chroma suppress (CSUP) circuit 106 is used to suppress a false color signal of a saturation portion, out of the image data band-limited by the LPF circuit 105.

On the other hand, the picked-up image data is also output to a luminance signal generation circuit 107. The luminance signal generation circuit 107 generates a luminance signal Y, from the input image data. An edge enhancement circuit 108 performs edge enhancement processing on the generated luminance signal Y.

An RGB conversion circuit 109 converts the color difference signals R-Y and B-Y output from the CSUP circuit 106, and the luminance signal Y output from the edge enhancement circuit 108 into RGB signals. A gamma correction circuit 110 performs gradation correction on the converted RGB signals. Thereafter, a color luminance conversion circuit 111 converts the RGB signals that have been subjected to the gradation correction into YUV signals.

A region discrimination circuit 112 performs discrimination between the object region and the background region with respect to the image data converted into the YUV signals. The detailed configuration of the region discrimination circuit 112 will be described below. An image processing unit 113 performs image processing such as blurring processing on the background region. A joint photographic experts group (JPEG) compression circuit 114 compresses by JPEG method or the like the image data which has been subjected to the image processing by the image processing unit 113, and stores the image data after being compressed in an external or internal recording medium 115.

Figure 2:
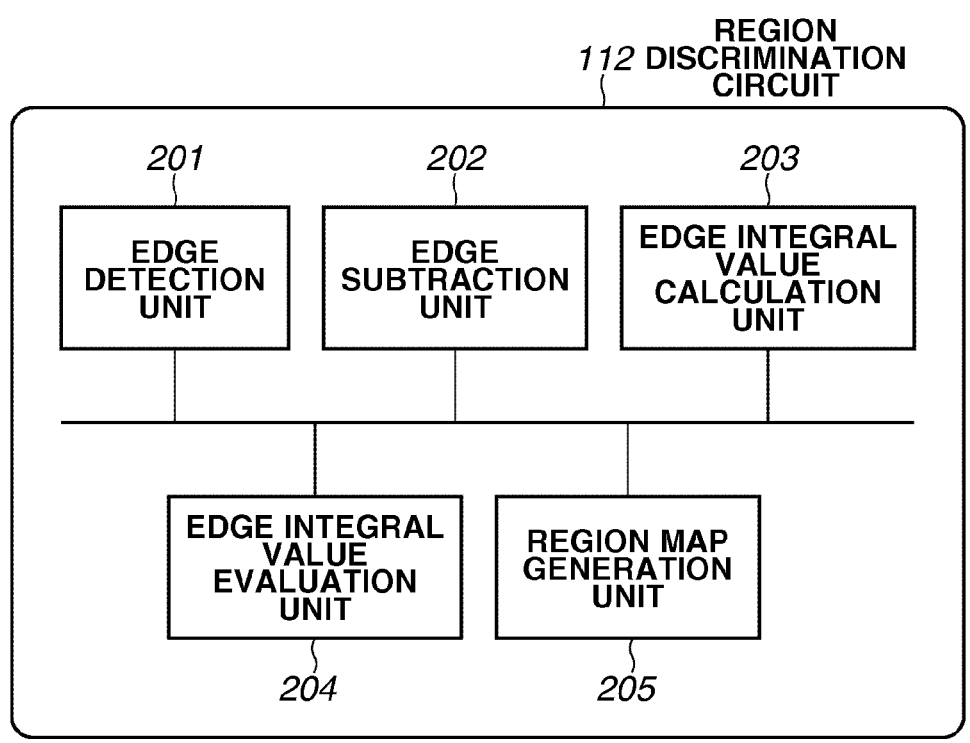
FIG. 2 is a block diagram illustrating a configuration of a region discrimination circuit 112 in FIG. 1 according to an exemplary embodiment of the present invention.

Then, a specific configuration of the region discrimination circuit 112 will be described. FIG. 2 is a block diagram illustrating a configuration of the region discrimination circuit 112 in FIG. 1. As illustrated in FIG. 2, the region discrimination circuit 112 includes an edge detection unit 201, an edge subtraction unit 202, an edge integral value calculation unit 203, an edge integral value evaluation unit 204, and a region map generation unit 205.

Hereinbelow, an operation of the image pickup apparatus 100 according to the present exemplary embodiment will be described in detail with reference to FIGS. 3 and 4. The following processing procedure is stored in the memory (not illustrated) in the control unit 117 as a computer program (software), and the CPU (not illustrated) in the control unit 117 reads out and executes the computer program.

First, an operation of the image pick-up processing by the image pickup apparatus 100 will be described with reference to FIG. 3. FIG. 3 is a flowchart illustrating an operation of the image pick-up processing by the image pickup apparatus 100.

After the status of a switch 1 (SW 1) for performing imaging standby operation such as exposure control and focus adjustment is turned "ON", and imaging standby operation to focus on the object and to obtain proper exposure is performed, the status of a switch 2 (SW 2) for performing an imaging operation is turned "ON". At this time, in step S301, the control unit 117 acquires a distance to a current object. In this process, the distance to the object can be calculated based on, for example, a lens position at which the object is in-focus state.

In step S302, the control unit 117 drives the imaging lens 101 so as to focus on the background. At this time, a photographer may optionally determine an in-focus position of the background by operating the image pickup apparatus 100, or the image pickup apparatus 100 may automatically perform focus detection of a plurality of areas within an angle of field, to thereby determine the in-focus position of the background.

In step S303, the control unit 117 acquires a distance to a current background. In this process, the distance to the background can be calculated based on, for example, a lens position at which the background is in-focus state. In step S304, the control unit 117 drives the imaging lens 101 so that the background is positioned at a front end of the depth of field. That is, the imaging lens 101 is moved to a position (third focal position) on a far distance side of the in-focus position of the background, within a range where the background is in the depth of field.

In step S305, the control unit 117 performs control to perform imaging operation. The image data generated by the image sensor 102, through the imaging operation is stored in the memory 103. Further, the image data obtained by the imaging operation is in focus on the background side which is within a range of the depth of field of the focus position, but the object positioned forward is blurred more than the background because it is outside the depth of field of the focus position, and a blur amount thereof is larger than when the background is in focus.

In step S306, the control unit 117 determines whether the background is present within the same depth of field as that of the object, when the object is brought into in-focus state, based on the distance to the background and the distance to the object previously acquired (based on the imaging condition). If the background is present within the same depth of field as that of the object (YES in step S306), the processing proceeds to step S307. On the other hand, if the background is not present within the same depth of field as that of the object (NO in step S306), the processing proceeds to step S309.

First, the processing in step S307 will be described. In step S307, the control unit 117 drives the imaging lens 101 to focus on the object. In step S308, the image pickup apparatus 100 performs imaging operation, and stores the image data generated by the imaging operation in the memory 103.

Next, the processing in step S309 will be described. In step S309, the control unit 117 drives the imaging lens 101 so that the object is positioned at a rear end of the depth of field. That is, the imaging lens 101 is moved to a position (second focal position) on a short distance side of the in-focus position (first focal position) of the object, within a range where the object is inside the depth of field. In step S310, the image pickup apparatus 100 performs imaging operation, and stores the image data generated by the imaging operation in the memory 103.

Next, an operation of region discrimination processing by the image pickup apparatus 100 will be described with reference to FIG. 4. FIG. 4 is a flowchart illustrating the region discrimination processing by the region discrimination circuit 112. More specifically, FIG. 4 is a flowchart illustrating the discrimination processing between the object region and the background region of the image data.

Figure 3:
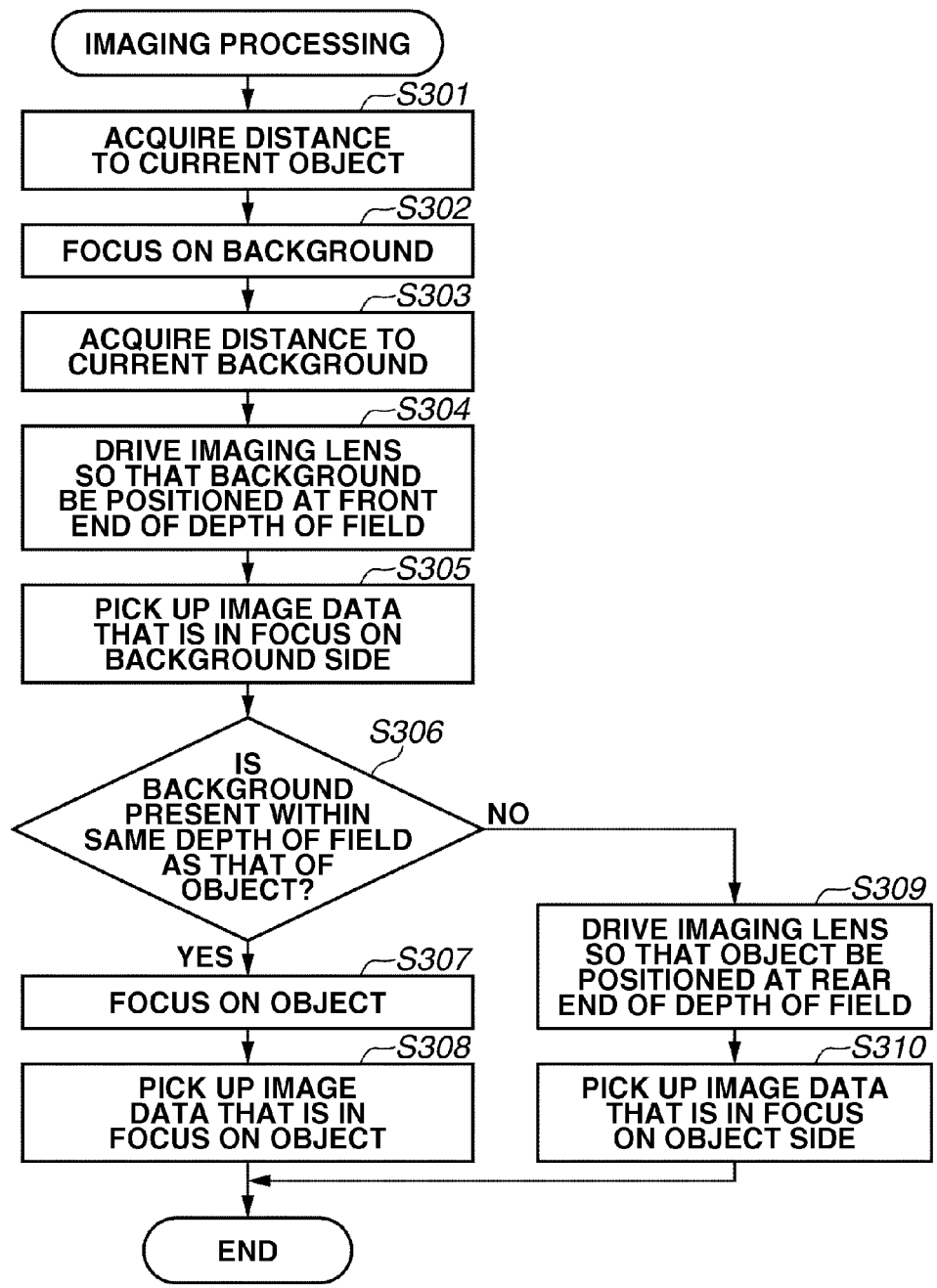
FIG. 3 is a flowchart illustrating an operation of image pick-up processing of the image pickup apparatus 100 according to an exemplary embodiment of the present invention.
Figure 4:
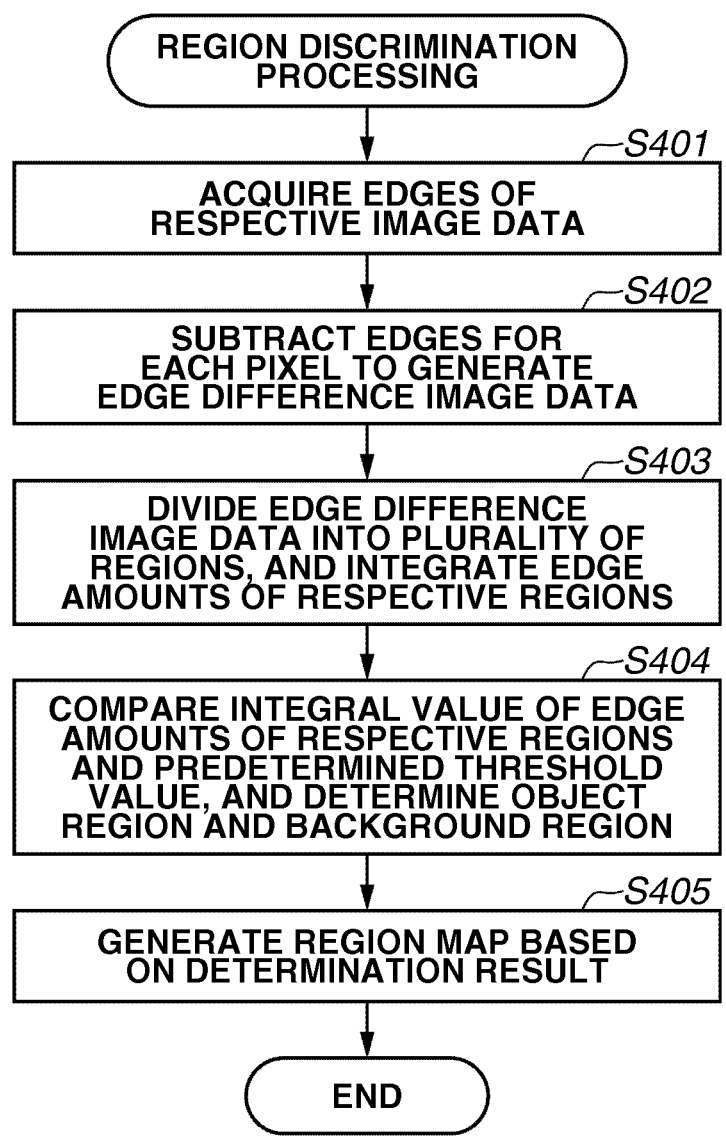
FIG. 4 is a flowchart illustrating an operation of region discrimination processing of the image pickup apparatus 100 according to an exemplary embodiment of the present invention.

In step S401, the edge detection unit 201 performs band pass filtering processing on the image data that is in focus on the object side and the image data that is in focus on the background side acquired by the processing illustrated in FIG. 3, to take absolute values, and acquires edges of respective image data.

The "image data that is in focus on the object side" is the image data acquired in steps S308 or S310. Further, the "image data that is in focus on the background side" is the image data acquired in step S305. The image data that is in focus on the object side is an example of first image data, and the image data that is in focus on the background side is an example of second image data.

In step S402, the edge subtraction unit 202 subtracts edges of the image data that is in focus on the background side from edges of the image data that is in focus on the object side for each pixel to generate the edge difference (hereinafter, referred to as edge difference image data) of the image data. In step S403, the edge integral value calculation unit 203 divides the edge difference image data generated in step S402 into a plurality of regions, and integrates edge amounts of respective regions.

In step S404, the edge integral value evaluation unit 204 compares an integral value of edge amounts of respective regions calculated in step S403 with a predetermined threshold value. If the integral value the edge amounts is equal to or greater than the predetermined threshold value, the edge integral value evaluation unit 204 determines that the region is an object region. On the other hand, the edge integral value evaluation unit 204, if the integral value of the edge amounts is smaller than the predetermined threshold value, determines that the region is a background region. The above-described predetermined threshold value may be a predefined fixed value, or may be adaptively obtained from a histogram distribution of the edges of the image data.

In step S405, the region map generation unit 205 generates a region map which can discriminate the object region and the background region, based on a determination result in step S404. In the above-described region map, for example, a combination ratio is represented with a pixel value of the image data itself. In order to make unevenness of a boundary inconspicuous, with respect to the region map, the low pass filter may be applied to a boundary between the object region and the background region. The above-described object region is an example of a first region, and the above-described background region is an example of a second region.

Next, the blurring processing of the background region according to the present exemplary embodiment will be described. The image processing unit 113 performs special filtering processing on the picked-up image data to generate blurred image data IMG 2. The image data which is a target to be subjected to the special filtering processing is image data picked up in either of steps S305, S308 and S310.

In the above-described special filtering processing, the filtering processing is performed on the picked-up image data based on designated filter shape. In the filtering processing, interpolation of the luminance value of saturated pixel is performed, by multiplying a pixel having a predetermined luminance value by a gain value K arbitrarily set.

Next, the image processing unit 113 combines the image data IMG 1 that is in focus on the object side acquired in step S308 or S310 and the blurred image data IMG 2, based on the above-described region map. An example of combination processing of the image data will be described. The image processing unit 113 combines the image data IMG 1 that is in focus on the object side and the blurred image data IMG 2, based on $\alpha$ ($0 \leq \alpha \leq 1$) obtained from the pixel value of the above-described region map, and generates combined image data "B". That is, the image processing unit 113 calculates each pixel B[i,j] of the combined image data B using the following equation 1.

$$B[i,j]=IMG1[i,j]*\alpha[i,j]+IMG2[i,j]*(1-\alpha) \quad \text{equation 1}$$

The combined image data "B" obtained by the above-described processing is acquired as the background blurred image data. Further, the generation processing of the background blurred image data in the present exemplary embodiment is not limited to the above-described exemplary embodiment.

For example, the background blurred image data may be acquired, by performing the special filtering processing only on the background region of the image data that is in focus on the object side, based on the region map. The blurred image data IMG 2 may be generated by reducing the picked-up image data, and enlarging the reduced image data to return it to its original size.

Alternatively, the blurred image data IMG 2 may be generated by applying the low pass filter to the picked-up image data. The "picked-up image data" is image data picked up in either of steps S305, S308 and S310.

It becomes possible to perform the special image processing on the background region segmented by the above-described processing.

Further, the present invention is not limited to these exemplary embodiments, and various variations and modifications are possible within the scope of the present invention. For example, the order of imaging operations of the image data that is in focus on the background side, the image data that is in focus on the object or the image data that is in focus on the object side may be interchanged.

Further, the region discrimination processing according to the present exemplary embodiment is performed using the image data that is in focus on the object side and the image data that is in focus on the background side, but it is not limited thereto. For example, when further performing another processing on an object which is present on a short distance side of a main object, three or more pieces of image data including image data picked up by moving the in-focus position to the short distance side of the object may be used. In this case, by performing the region discrimination processing according to the present exemplary embodiment in which the main object is regarded as the background, it becomes possible to divide the image data into a plurality of regions according to the depth of field.

Further, in the above-described exemplary embodiment, an example of picking up the image data is illustrated in steps S305, S308 and S310, but it is not limited thereto. For example, after having picked up the image data that is in focus on the object, the image data that is in focus on the background side may be generated by performing image processing so that the image data comes closer to an in-focus state of an image which would be obtained if the imaging lens is located at a position at which the background is in-focus state. Similarly, image data that is in focus on the object side may be generated by performing image processing so that the image data comes closer to a focus state of an image which would be obtained if the object is positioned at a rear end of the depth of field.

According to the present exemplary embodiment, after acquiring respective edges of image data picked up at the in-focus position of the object or by shifting to a position on the short distance side of the in-focus position of the object, and image data picked up by shifting to a position on a long distance side of the in-focus position of the background, region discrimination is performed based on their difference values. Accordingly, even in the image data in which a depth difference between the object and the background is insufficient, it becomes possible to perform region discrimination between the object and the background with a high accuracy.

Image data of the background region to which blurring effect has been given by exposure amount correction processing for estimating actual exposure amount of saturated pixel, and applying a gain according to the estimated actual exposure amount, and image data of the object region to which the blurring effect has not been given may be combined. In such a case, a blur and bleed due to a blur of the saturated pixel on the object region may occur, in the background region in the proximity of the object region.

Figure 11A:
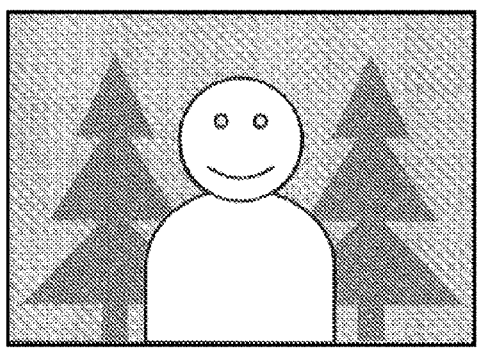
FIGS. 11A, 11B, and 11C illustrate blurs and bleeds occurring in the conventional image processing.
Figure 11B:
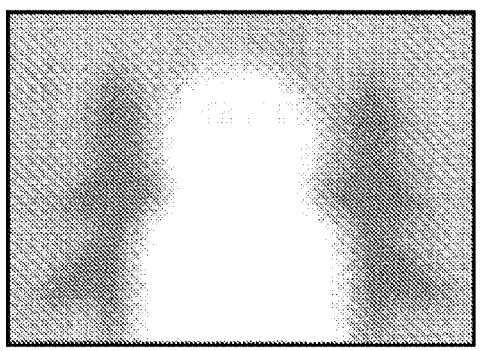
Figure 11C:
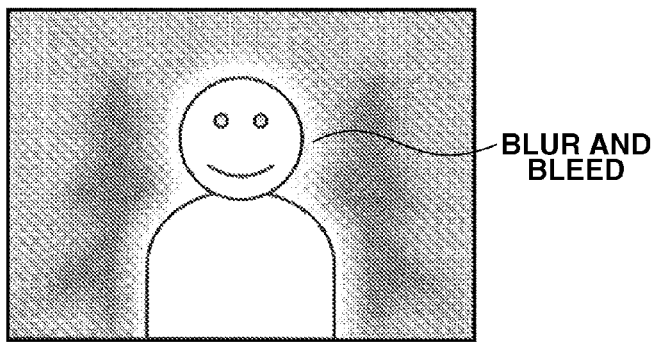

Hereinbelow, referring to FIGS. 11A to 11C, the phenomenon will be specifically described. FIG. 11A illustrates image data picked up while the object is brought into focus. FIG. 11B illustrates the image data to which the blurring effect has been given by performing exposure amount correction processing on the image data illustrated in FIG. 11A. In a case where only the object region of the image data illustrated in FIG. 11A is segmented, and is combined with the image data illustrated in FIG. 11B, a blur and bleed occurs as illustrated in FIG. 11C.

Thus, in the present exemplary embodiment, the configuration of the image pickup apparatus, and the operation of the image pickup apparatus for obtaining the image data in which occurrence of the blur and bleed on the background region in the close proximity of the object region is suppressed will be described.

Figure 5:
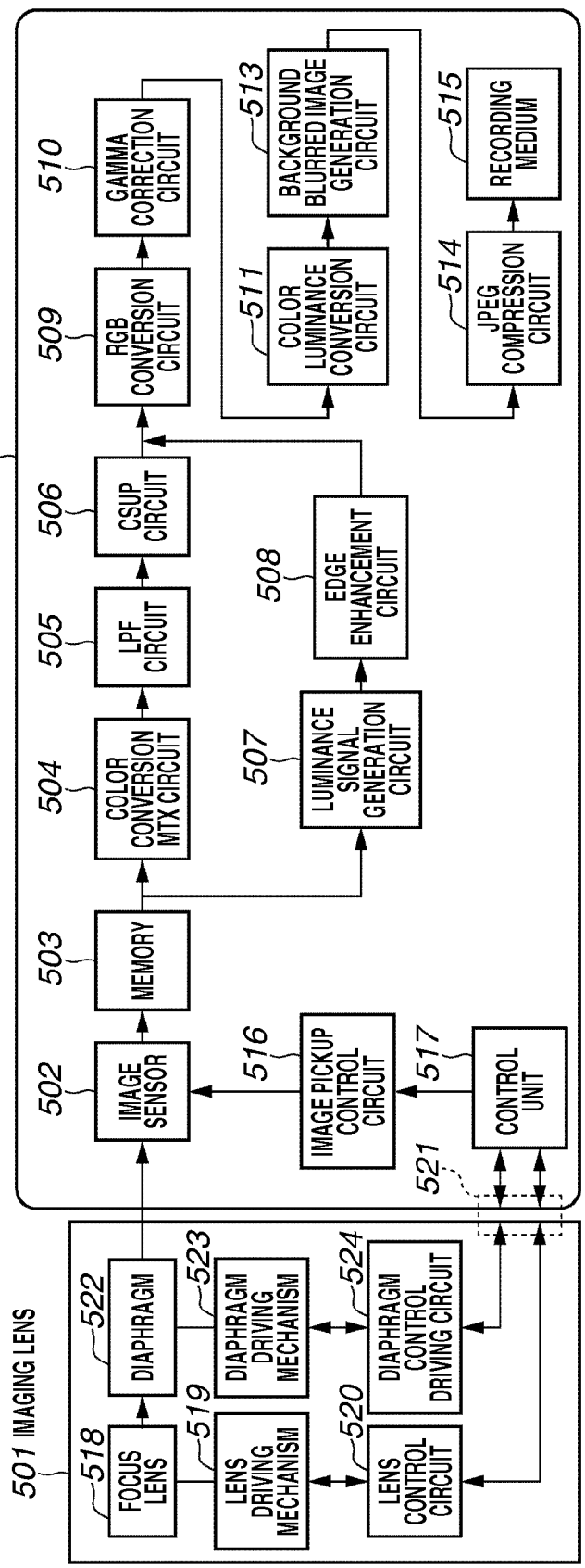
FIG. 5 is a block diagram illustrating a configuration of an image pickup apparatus 500 according to an exemplary embodiment of the present invention.

First, an overall configuration of the image pickup apparatus will be described with reference to FIG. 5. FIG. 5 is a block diagram illustrating the configuration of an image pickup apparatus 500.

The image pickup apparatus 500 includes a control unit 517 that performs control of the entire image pickup apparatus 500. The control unit 517 is constituted by a CPU, an MPU, or the like, and controls operations of respective circuits described below. An imaging lens 501 is detachably attached to the image pickup apparatus 500 via a mount unit (not illustrated). An electric contact unit 521 is provided in the mount unit.

The control unit 517 in the image pickup apparatus 500 performs communication with the imaging lens 501 via the electric contact unit 521, and controls driving for adjusting a focus lens 518 and a diaphragm 522 within the imaging lens 501. A lens control circuit 520, according to a signal from the control unit 517, controls a lens driving mechanism 519 that drives the focus lens 518 in an optical axis direction to perform focusing.

The lens driving mechanism 519 has a stepping motor or a direct current (DC) motor as a driving source. Further, a diaphragm control driving circuit 524 controls a diaphragm driving mechanism 523 for altering an aperture diameter of the diaphragm 522, according to a signal from the control unit 517. In FIG. 5, only the focus lens 518 is illustrated as a lens within the imaging lens 501, but in addition to this, a variable power lens or a stationary lens is provided, and a lens unit is configured including these lenses.

In FIG. 5, an image sensor 502 is constituted by a CCD sensor, a CMOS sensor, or other sensors, and its surface is covered with a RGB color filter such as Bayer array, and is capable of performing color imaging. When an object image incident via the imaging lens 501 including the focus lens 518 attachable and detachable to and from the image pickup apparatus 500 is formed on the image sensor 502, the image data is generated, and is stored in a memory 503.

The control unit 517 calculates a shutter speed and an aperture value so that the entire image data shows proper exposure, and calculates a driving amount of the focus lens 518 so as to be in focus on the object located within an in-focus region. Then, information indicating the exposure value (shutter speed, and aperture value) calculated by the control unit 517 and the driving amount of the focus lens 518 is output to an image pickup control circuit 516, the diaphragm control driving circuit 524, and the lens control circuit 520. Exposure control and focus adjustment is performed based on each value.

A color conversion matrix circuit 504 applies color gain so that the picked-up image data is reproduced in an optimal color, and converts them into color difference signals R-Y and B-Y. A low pass filter (LPF) circuit 505 is used to limit a band of the color difference signals R-Y and B-Y. A chroma suppress (CSUP) circuit 506 is used to suppress a false color signal of saturated portion, out of the image data band-limited by the LPF circuit 505.

On the other hand, the picked-up image data is also output to a luminance signal generation circuit 507. The luminance signal generation circuit 507 generates a luminance signal Y from the input image data. An edge enhancement circuit 508 performs edge enhancement processing on the generated luminance signal Y.

An RGB conversion circuit 509 converts the color difference signals R-Y and B-Y output from CSUP circuit 506, and the luminance signal Y output from the edge enhancement circuit 508 into RGB signals. A gamma correction circuit 510 performs gradation correction on the converted RGB signals. Thereafter, a color luminance conversion circuit 511 converts the RGB signals that have been subjected to the gradation correction into YUV signals.

A background blurred image generation unit 513 performs image processing for yielding a blurring effect on the converted image data. The detailed configuration of the background blurred image generation unit 513 will be described below. A JPEG compression circuit 514 compresses the image data which has been subjected to image processing by the background blurred image generation unit 513 using the JPEG scheme or the like, and causes the image data after being compressed to be stored in an external or internal recording medium 515.

Figure 6:
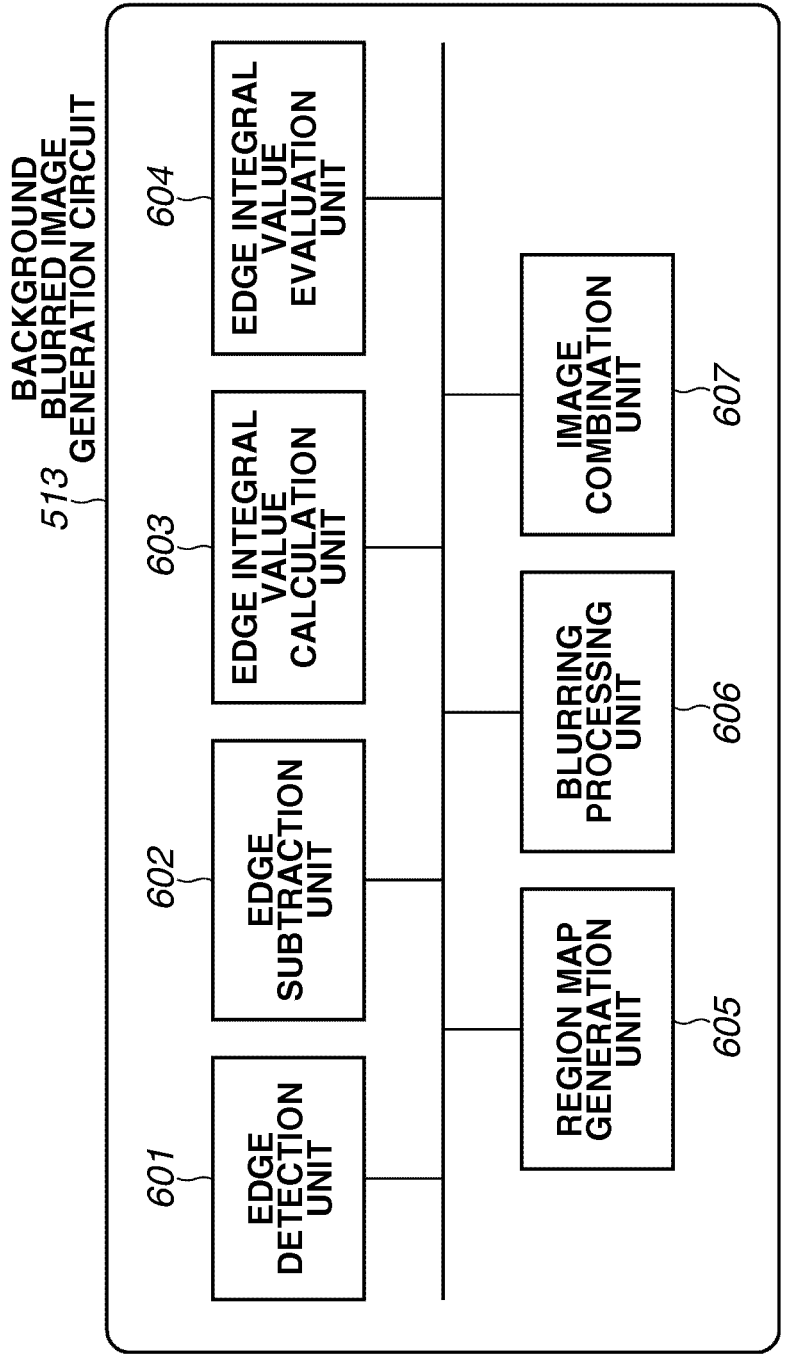
FIG. 6 is a block diagram illustrating a configuration of a background blurred image generation unit 513 in FIG. 5 according to an exemplary embodiment of the present invention.

Next, a specific configuration of the background blurred image generation unit 513 will be described. FIG. 6 illustrates a configuration of the background blurred image generation unit 513. As illustrated in FIG. 6, the background blurred image generation unit 513 includes an edge detection unit 601, an edge subtraction unit 602, an edge integral value calculation unit 603, an edge integral value evaluation unit 604, a region map generation unit 605, a blurring processing unit 606, and an image combination unit 607.

Next, referring to the flowchart in FIG. 7, the background blurring processing by the background blurred image generation unit 513 will be described.

In step S701, the image pickup apparatus 500 performs imaging operation while focusing on the object. Next, the image pickup apparatus 500 performs imaging operation by displacing the focus lens to a predetermined amount to focus on the background. After a plurality of image data have been picked up at such different in-focus positions, in step S702, the edge detection unit 601 detects edges of the image data which has been picked up by focusing on the object, and detects edges of the image data which has been picked up by focusing on the background.

Examples of edge detection methods include a method for detecting edges of the image data by performing band pass filtering over the picked-up image data to take an absolute value. The method for detecting edges is not limited to this, and other methods may be used. Hereinbelow, edges detected from the image data picked up by focusing on the object are referred to as edge image data on the object in-focus side, and edges detected from the image data picked up by focusing on the background are referred to as edge image data on the background in-focus side.

In step S703, the edge subtraction unit 602 subtracts the edge image data on the background in-focus side, from the edge image data on the object in-focus side for each pixel to generate the difference of edges of image data (hereinafter, referred to as edge difference image data). In step S704, the edge integral value calculation unit 603 divides the edge difference image data generated in step S703 into a plurality of regions, and integrates edge amounts of respective regions.

In step S705, the edge integral value evaluation unit 604 compares an integral value of edge amounts of respective regions calculated in step S704 and a predetermined threshold value. If the integral value of edge amounts is equal to or greater than the predetermined threshold value, the edge integral value evaluation unit 604 determines the region as an object region. On the other hand, the edge integral value evaluation unit 604, if an integral value of edge amounts is smaller than the predetermined threshold value, determines the region as a background region. The above-described predetermined threshold value may be a stationary value determined in advance, or may be adaptively obtained from a histogram distribution of edges of the image data.

In step S706, the region map generation unit 605 generates segmented maps which enable discrimination of the object region and the background region, based on a determination result in step S705. In the segmented maps, for example, a combination ratio is represented with a pixel value of the image data itself. In order to make unevenness of a boundary inconspicuous, with respect to the segmented maps, the low pass filter may be applied to a boundary between the object region and the background region.

In step S707, the blurring processing unit 606 performs blurring processing based on the segmented maps on the image data picked up while the object is in-focus state, to generate blurred image data.

The details of blurring processing in step S707 will be described. In the blurring processing, the filtering processing is performed on the image data picked up while the object is in-focus state, based on designated filter shape. In the filtering processing, the filtering processing is performed after multiplying a pixel having a predetermined luminance value, by a gain value K obtained from the table illustrated in FIG. 8A, and interpolating the luminance value of the saturated pixel. Hereinbelow, a pixel currently being scanned (target portion) in the filtering processing is referred to as scanned pixel.

Figure 8A:
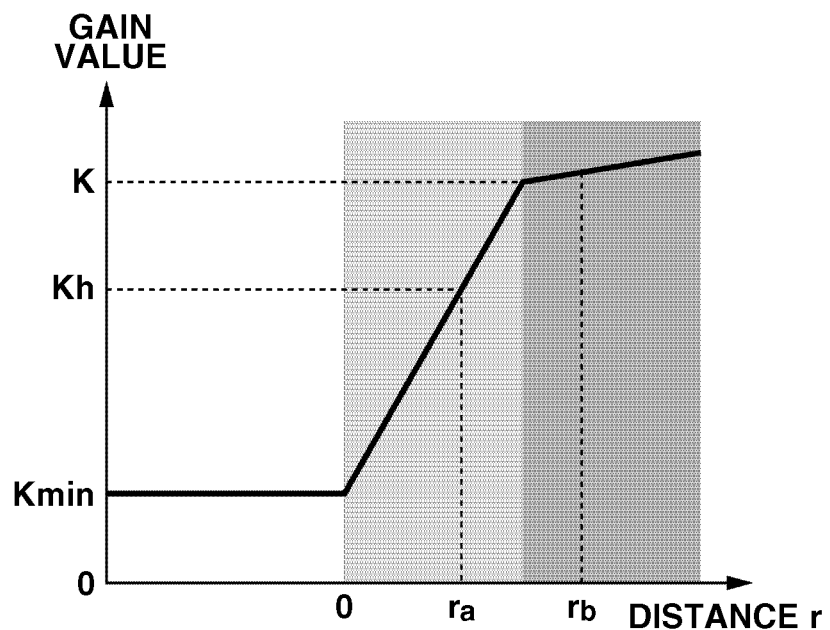
FIGS. 8A and 8B illustrate an example of a relationship between a distance of scanned pixels and an object region, and gain a value of the image pickup apparatus 500 according to an exemplary embodiment of the present invention.

FIG. 8A, instead of a table form, illustrates a relationship between distances of the scanned pixels to the object region, and gain values. Actually, however, gain values corresponding to respective distances of the scanned pixels to the object region are set in a table. The object region can be discriminated from the above-described segmented maps.

Figure 8B:
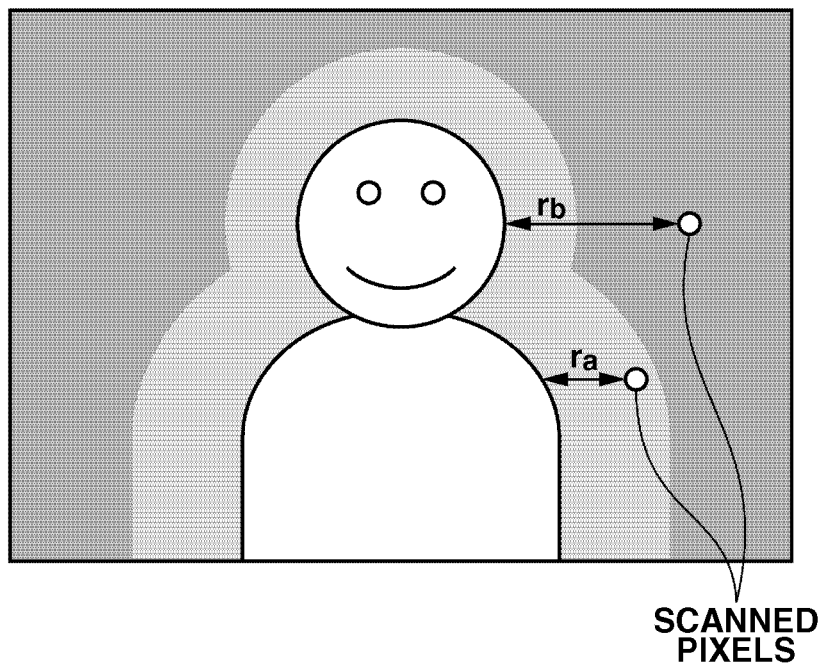

As illustrated in FIG. 8A, a gain value K for the scanned pixel takes a value 0 or more, and is a value determined depending on a distance "r" between the scanned pixel and the object region. For example, as illustrated in FIG. 8B, it is assumed that there are scanned pixels having distances from the object region ra, and rb (ra<rb). At this time, in the table illustrated in FIG. 8A, a gain value Kh is set for the scanned pixel having a shorter distance ra from the object region, and a gain value K which is higher than Kh is set for the scanned pixel having a longer distance rb from the object region.

In a case where the scanned pixel lies on the object region, the gain value is set to Kmin. A gain value to be set in the table illustrated in FIG. 8A is determined based on a number of taps or waveform of a filter. For example, if the number of taps of filter is great, "r" is set to a gain value with greater value in order to be free from the influence of pixels on the object region.

Figure 9:
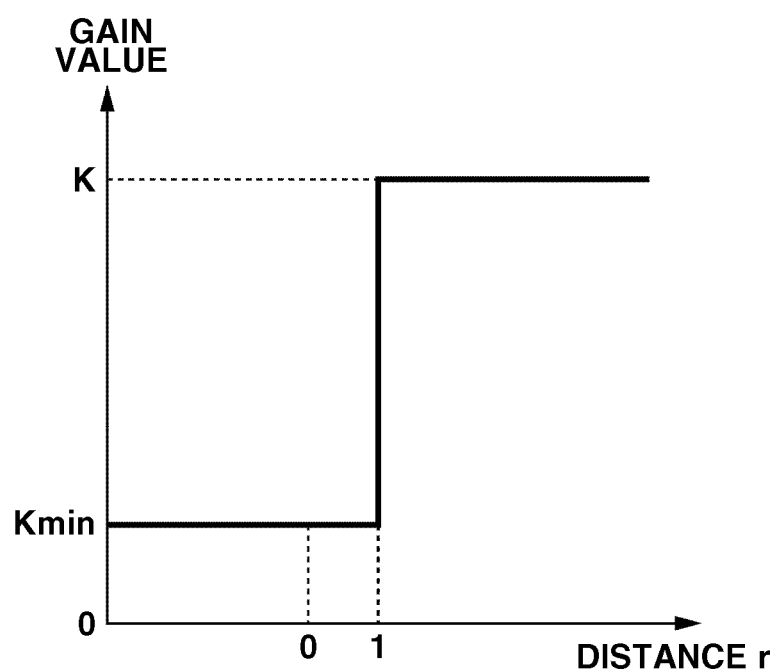
FIG. 9 illustrates another example of a relationship between a distance of a scanned pixel and an object region, and a gain value of the image pickup apparatus 500 according to an exemplary embodiment of the present invention.

However, the present invention is not limited to this, but gain values K and Kmin with stationary values as illustrated in FIG. 9 may be used. The gain value K is an example of a predetermined second gain value, and the gain value Kmin is an example of a predetermined first gain value.

The advantages when the gain values K and Kmin with the stationary values are used will be described. For example, if segmentation of the object region is accurately performed on a per-pixel basis, a gain value K is always set for a pixel discriminated as a background region, and a gain value Kmin is always set for a pixel discriminated as the object region. As a result, a blur of the saturated pixel of the object region is suppressed to a minimum, and therefore a blur and bleed of the image data after being combined can be prevented. As illustrated in FIG. 9, K>Kmin is satisfied.

Next, the advantages of determining a gain value using a table as illustrated in FIG. 8A will be described. For example, if an error between actual position of the object region and a position of segmented object region occurs, a blur and bleed due to a blur of the saturated pixel of the object region occurs, in the image data after being combined just for the error. In this case, a blur and bleed of the image data after being combined can be prevented, by setting a lower gain value for a pixel in the proximity of the object region.

Figure 10:
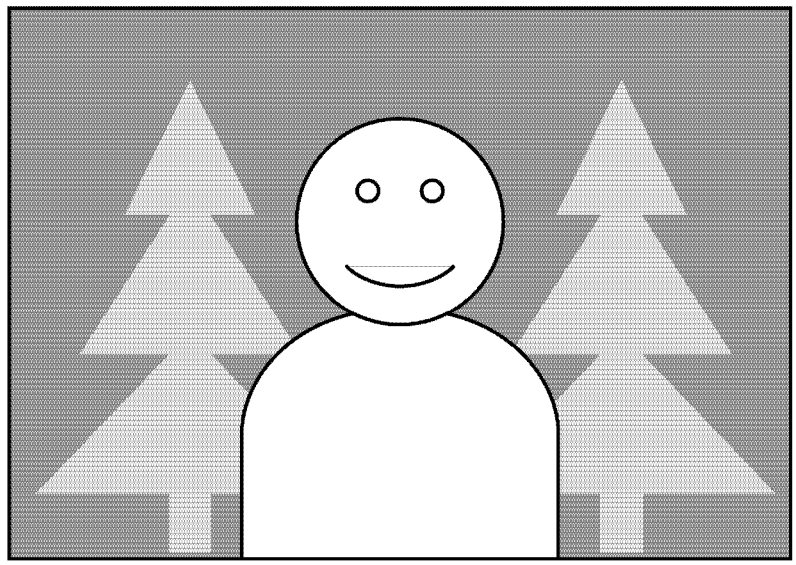
FIG. 10 is a distance map of the image pickup apparatus 500 according to an exemplary embodiment of the present invention

The above-described filtering characteristics or the gain value may be adaptively changed, based on a distance map including depth information of the picked-up image data. FIG. 10 illustrates an example of the distance map in which depths of the image data are decomposed into a plurality of levels. By referring to the distance map as illustrated in FIG. 10, a filter shape is set to large, or a gain value is set to high for a region with deep depth. On the other hand, a filter shape is set to a small, or a gain value is set to low for a region with shallow depth.

Figure 7:
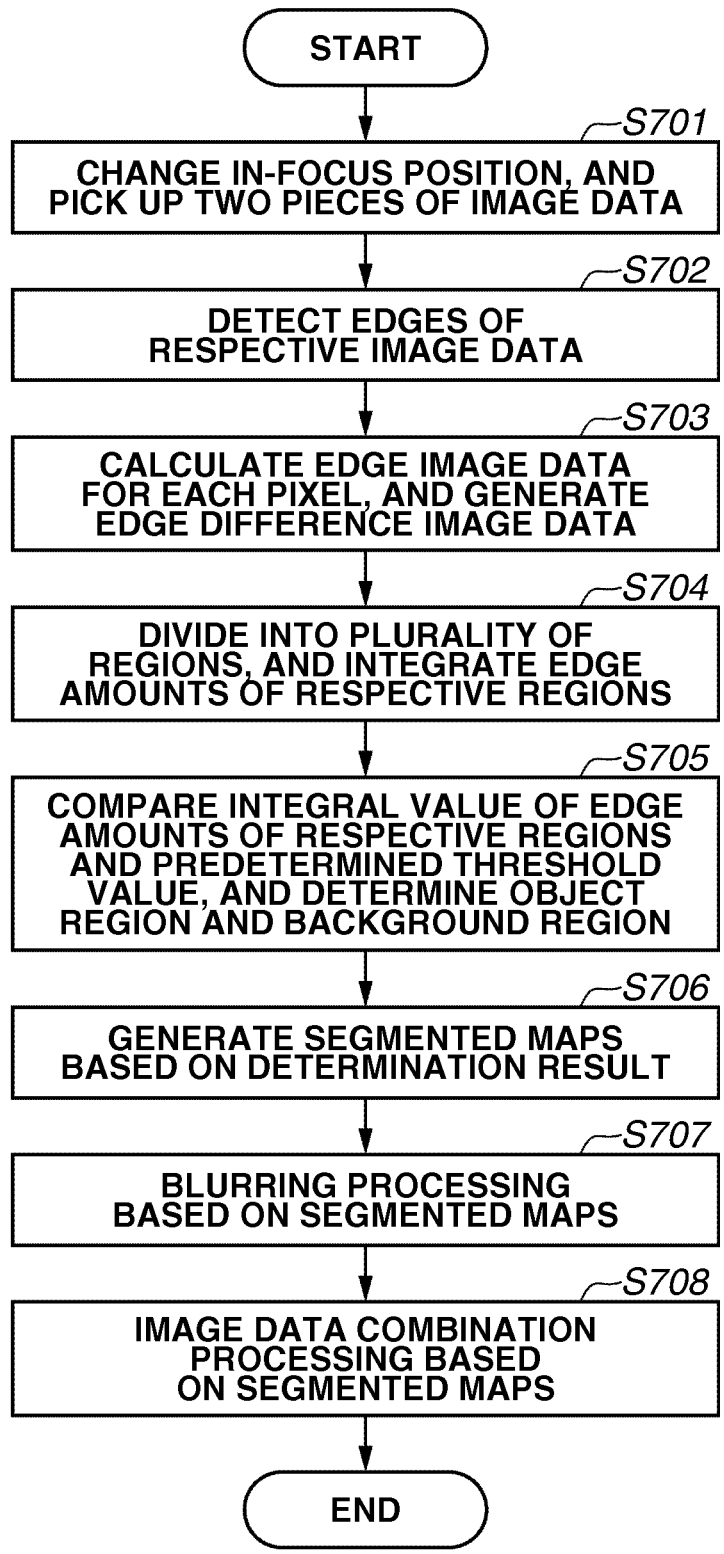
FIG. 7 is a flowchart illustrating an operation of background blurring processing of the image pickup apparatus 500 according to an exemplary embodiment of the present invention.

Returning to the description of FIG. 7, in step S708, the image combination unit 607 segments the object region from the image data picked up while the object is in-focus state, based on the segmented maps, and combines thereof with the blurred image data generated in step S707.

In this process, it is only necessary to perform combination processing of the image data, in a similar way to, for example, the above-described first exemplary embodiment. In other words, the image combination unit 607 combines the object region of the image data IMG 1 [i, j] picked up while the object is in-focus state and the blurred image data IMG 2 [i, j], based on α [i, j] (0≤α≤1) obtained from pixel values of the segmented maps, to generate combined image data B [i, j]. That is, the image combination unit 607 calculates combined image data B [i, j] using the equation 1 in the first exemplary embodiment. [i, j] indicates each pixel.

By the above-described processing, the image combination unit 607 can acquire blurred image data obtained by interpolating the luminance value of the saturated pixel, while suppressing occurrence of the blur and bleed of the background region in the close proximity of the object region. Further, a distance "r" between the scanned pixel and the object region in the present exemplary embodiment is a distance to a object region which is present nearest with the scanned pixel at its center, but the distance "r", by obtaining a center of gravity coordinates of the main object, may be a distance from the center of gravity coordinates to the scanned pixel.

Further, the segmented maps in the present exemplary embodiment are generated from two pieces of the image data: the image data picked up while the object is in-focus state and the image data picked up while the background is in-focus state, but may be generated from three or more pieces of the image data including the image data picked up while the front side of the object is in-focus state.

As described above, according to the present exemplary embodiment, image data which has been subjected to the filtering processing by switching a gain value for the saturated pixel according to a distance from the object region, and image data picked up while a sharp object is in-focus state, are combined based on the segmented maps. Accordingly, it becomes possible to generate image data to which the blurring effect is given with estimated actual exposure amount to a high luminance region of the background, while suppressing occurrence of a blur and bleed on the periphery of a high luminance region of the object, and the image data desirable for a photographer can be provided.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-262684 filed Nov. 30, 2011 and No. 2011-262703 filed Nov. 30, 2011, which are hereby incorporated by reference herein in their entirety.

What is claimed is:

1. An image pickup apparatus comprising:
a generation unit configured to generate first image data, when an in-focus position if a first focal position at which an object is in focus state or a second focal position on a near distance side of the first focal position, and second image data, when an in-focus position is a third focal position on a far distance side of a focal position at which a background is in focus state; and
a discrimination unit configured, based on the first and second image data generated by the generation unit, to discriminate between a first region including the object and a second region including the background,
wherein the second focal position is a position within a range in which the object falls inside a depth of field.

2. The image pickup apparatus according to claim 1, wherein the third focal position is a position within a range in which the background falls inside a depth of field, and is a position on a far distance side of a focal position at which the background is brought into focus.

3. The image pickup apparatus according to claim 1, wherein the generation unit is configured to generate the first image data by positioning a focus lens at either of the first focal position and the second focal position, according to an imaging condition.

4. The image pickup apparatus according to claim 1, further comprising:
- a processing unit configured to perform predetermined filtering processing on the first image data or the second image data; and
- a combination unit configured to combine the first image data or the second image data that has been subjected to the predetermined filtering processing by the processing unit, based on a discrimination result of the discrimination unit, and the first image data that has been generated by the generation unit.

5. The image pickup apparatus according to claim 4, further comprising:
- a determination unit configured to determine a gain value according to a distance between a target portion in the image data and a region including the object, wherein the processing unit performs the predetermined filtering processing on the image data after interpolating the target portion using the gain value determined by the determination unit.

6. The image pickup apparatus according to claim 5, wherein the determination unit is configured so that the determined gain value is less as the distance between the target portion and the region including the object decreases.

7. The image pickup apparatus according to claim 5, wherein the determination unit is configured to determine, in a case where the target portion is included in the region including the object, a predetermined first gain value, and determines, in a case where the target portion is included in other than the region including the object, a predetermined second gain value.

8. The image pickup apparatus according to claim 5, wherein the predetermined first gain value is smaller than the predetermined second gain value.

9. The image pickup apparatus according to claim 5, wherein the determination unit changes the gain value to be determined according to characteristics of a filter used in the predetermined filtering processing.

10. The image pickup apparatus according to claim 5, wherein the determination unit is configured to change the gain value to be determined according to a depth of field of the target portion.

11. The image pickup apparatus according to claim 5, wherein the processing unit is configured to change the characteristics of the filter according to a depth of field of the target portion.

12. The image pickup apparatus according to claim 1, further comprising:
- a processing unit configured to reduce the size of the first image data or the second image data, and to enlarge reduced image data to thereby return it to its original size; and
- a combination unit configured to combine the first image data or the second image data that has been processed by the processing unit based on a discrimination result of the discrimination unit, and the first image data that has been generated by the generation unit.

13. The image pickup apparatus according to claim 1, further comprising:
- a processing unit configured to apply a low pass filter to the first image data or the second image data; and
- a combination unit configured to combine the first image data or the second image data processed by the processing unit, based on a discrimination result of the discrimination unit, and the first image data that has been generated by the generation unit.

14. A control method of an image pickup apparatus comprising:
- generating first image data, when an in-focus position is a first focal position at which an object is in focus state or a second focal position on a near distance side of the first focal position, and second image data, when an in-focus position is a third focal position on a far distance side of a focal position at which a background is in focus state; and
- discriminating, based on first image data and second image data, a first region containing the object and a second region containing the background.

* * * * *